Sept. 8, 1931.  E. O. STOUT ET AL  1,821,950
PRESSURE RESPONSIVE DEVICE AND ITS MANUFACTURE
Filed May 31, 1927  2 Sheets-Sheet 1

Elmer O. Stout  Inventors
Otto M. Summers

By
Spencer, Hardman + Fehr
Attorneys

Sept. 8, 1931.　　　　E. O. STOUT ET AL　　　　1,821,950
PRESSURE RESPONSIVE DEVICE AND ITS MANUFACTURE
Filed May 31, 1927　　　2 Sheets-Sheet 2

Inventors
Elmer O. Stout
Otto M. Summers

By
Spencer, Hardman & Felix
Attorneys

Patented Sept. 8, 1931

1,821,950

UNITED STATES PATENT OFFICE

ELMER O. STOUT AND OTTO M. SUMMERS, OF DAYTON, OHIO, ASSIGNORS, BY MESNE ASSIGNMENTS, TO FRIGIDAIRE CORPORATION, A CORPORATION OF DELAWARE

PRESSURE RESPONSIVE DEVICE AND ITS MANUFACTURE

Application filed May 31, 1927. Serial No. 195,232.

This invention relates to the manufacture of automatic controllers including a pressure responsive element, and particularly to pressure responsive controllers for refrigerating apparatus.

One object of the invention is to simplify the construction and reduce the cost of manufacture of a pressure responsive element of the type having one or more flexible walls between which a pressure fluid may be confined.

A further object is to increase the durability of pressure responsive elements of this type.

Further objects and advantages of the present invention will be apparent from the following description, reference being had to the accompanying drawings wherein a preferred embodiment of one form of the present invention is clearly shown.

Figure 1:
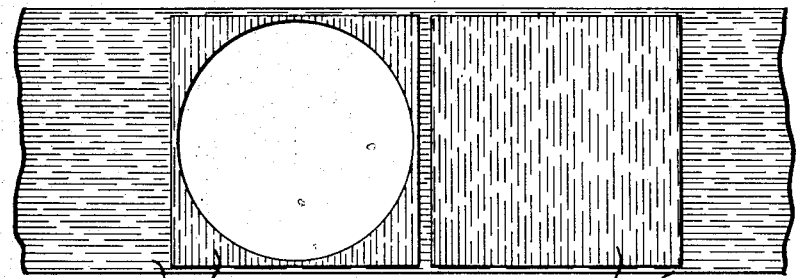
Fig. 1 is a plan view showing the sheet metal parts from which a flexible wall or diaphragm of the pressure responsive element is manufactured.
Figure 2:
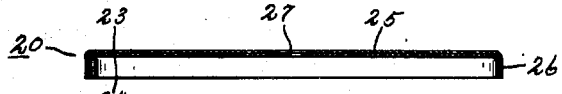
Fig. 2 is a sectional view of one of the diaphragms which has been formed from a disc punched from the opening shown in Fig. 1 which is drawn to a smaller scale than Fig. 2.
Figure 8:
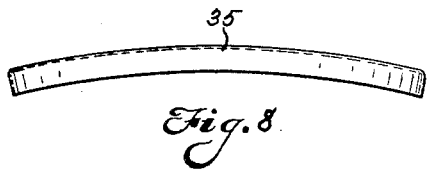
Fig. 8 is an edge view of a diaphragm which has been punched from a single sheet of diaphragm material. This view shows the tendency of the diaphragm to be distorted, due to the formation of its flange.

Referring to Figs. 1 and 2, each diaphragm or half shell, such as shell 20, is formed by punching superposed discs from pieces 21 and 22 of sheet diaphragm material such as phosphor bronze, the grain of the sheet 21 being at least transverse to and preferably at right angles to the grain of the piece 22, as indicated by the broken lines in Fig. 1. These superposed discs are simultaneously formed into nested cups 23 and 24, thereby providing a flat laminated end wall 25 and a laminated annular flange 26. The wall 25 is provided with a central opening 27. In similar fashion, another half shell or diaphragm 30 is formed, thereby comprising nested cups 31 and 32 providing a laminated end wall 33 and a laminated annular flange 34. If either of the diaphragms 20 or 30 were formed by punching and shaping a single thickness of diaphragm material, the operation of forming the annular flanges would result in producing a somewhat distorted diaphragm 35, as shown in Fig. 8. By punching and forming the diaphragm from superposed plates or sheets of material with the grain of one sheet transverse to the grain of the other sheet, the tendency of one of the diaphragm cups to be distorted is counteracted by the tendency of the other to become distorted in a different direction.

Figure 3:
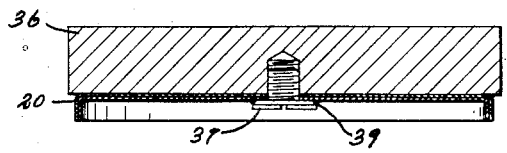
Fig. 3 is a sectional view showing the attachment of the diaphragm to a solid body by a screw to which the diaphragm is soldered.

After the diaphragms have been formed in the manner described, each diaphragm is attached by screws to a flat solid block 36. For example, the diaphragm 20 is attached to the block 36 by a solid screw 37; and the diaphragm 30 is attached by a hollow screw 38, shown in Fig. 5, in order to admit pressure fluid to the space between the diaphragms after they are assembled. The clamping of a diaphragm to a solid block holds the diaphragm end wall substantially flat during the process of soldering the head of the screw, such as screw 37, to the diaphragm, the soldering being indicated by numeral 39 in Fig. 3.

Figure 4:
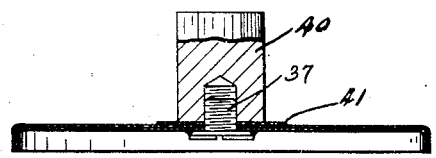
Fig. 4 is a sectional view showing the attachment of the diaphragm and screw to a cap preparatory to washing the diaphragm.
Figure 5:
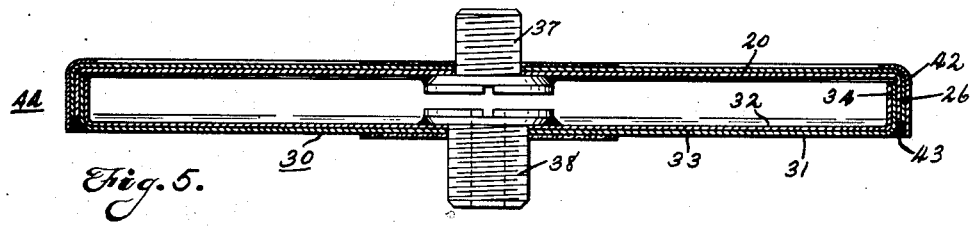
Fig. 5 is an enlarged sectional view of a pressure responsive element formed by two telescopically engaged diaphragms of the type shown in Fig. 4, these diaphragms being secured together by solder which is confined by enclosing ring.

After soldering the central screw to the diaphragm, the assembly is removed from the block and a cap 40 is attached to each of the screws 37 or 38, as shown in Fig. 4, there being a sealing gasket 41, preferably of vellumoid, located between the bottom of the cap 40 and the diaphragm. This gasket prevents liquid from entering between the diaphragm laminations during the subsequent operation of washing the assembly. Washing is effected preferably by a ten per cent solution of soda. After both diaphragms 20 and 30 have been washed, they are assembled with a diaphragm ring as shown in Fig. 5; and solder, indicated by numeral 43, is placed in the annular groove which is provided between the flange 34 of the diaphragm 30 and the ring 42. After this assembling operation and before removing the caps 40, the assembly may be washed again in a soda solution and is then dried thoroughly. Following this, the caps 40 are removed and the assembly is heated to about 240° F. for a period of 30 minutes in order to thoroughly dry the interior of the assembly. Then the assembly is submerged in a suitable oil, which tends to collect any small particles of solder which are loose therein. The oil is drained from the assembly to remove these and other foreign particles.

Figure 6:
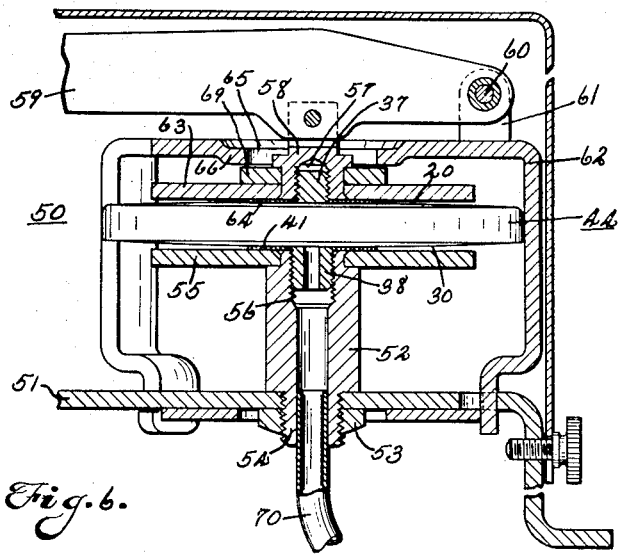
Fig. 6 is a fragmentary sectional view of controlling apparatus including the pressure responsive element shown in Fig. 5.
Figure 7:
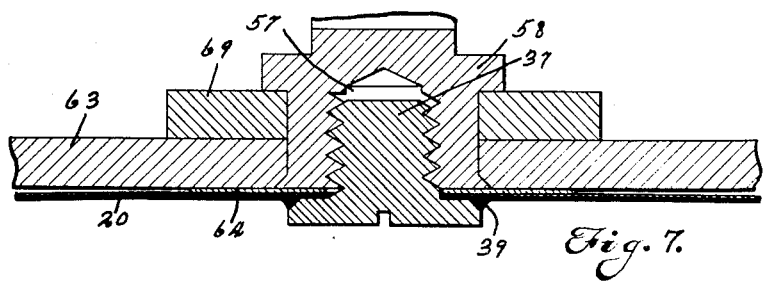
Fig. 7 is a fragmentary sectional view on an enlarged scale showing the method of attaching the upper flexible diaphragm of the pressure responsive element to a moving part of the controller.

This assembly, which is called the pressure responsive element 44, may be associated with any suitable type of pressure responsive controller,—for example, the controller 50 shown in section in Fig. 6. The controller 50 includes a base 51 supporting a tube 52, which is secured to the base 51 by a clamping nut 53 cooperating with the threaded extension 54 of the tube 52. Adjacent its upper end, the tube 52 supports a flat plate 55. The hollow screw 38, which has been previously soldered to the diaphragm 30, is screwed into a threaded bore 56 in the tube 52 in order to attach the element 50 to the tube 52 and to clamp between the diaphragm 30 and the plate 55 the vellumoid disc 41, which operates to seal this joint. The screw 37 of the upper diaphragm 20 cooperates with the threaded opening 57 in a link member 58 which transmits motion from the element 50 to a lever 59 which is pivoted at 60 upon an ear 61 extending vertically above a diaphragm cage 62. The left hand end of the lever 59 is not shown, but it will be understood that the lever is connected to a suitable controller such as an electric switch for controlling the driving motor of a refrigerating machine. The screw 37 and nut member 58 cooperate to attach the element 50 to the part 58 and to clamp a vellumoid gasket 64 between the upper diaphragm 20 and a disc 63 attached to the nut 58. The cage 62 is provided with an opening 65 for receiving the link or nut element 58, and the opening 65 is surrounded by a flange 66, which is arranged to be engaged by a spacer 69 attached to the nut 58, and, in that manner, to provide a stop for limiting the upward movement of the diaphragm 20. The tube 52, which communicates with the interior of the pressure responsive element, is connected by a pipe 70 with a vessel (not shown) containing a volatile liquid and generally known as a "thermostat bulb" adapted to be located within the cooling chamber or near the evaporator of a mechanical refrigerator.

The discs 63 and 55 cooperate with the upper and lower diaphragms, respectively, to limit the approaching movement of the diaphragms relative to each other.

Aside from facilitating the manufacture of a diaphragm wall, which is free from distortion, the laminated construction is more durable and there is less danger of escape of the pressure fluid. The diaphragms are required to withstand certain pressures without distorting and if these diaphragms are formed from a relatively thick sheet of metal, they are apt to crack along the grain of said metal at the point where they are bent to form the cup. In the present invention this cracking at the grain is obviated. By utilizing thin sheet metal which will bend more readily, cups can be formed therewith without cracking the same, and, of course it is then desirable to use more than one lamina to provide sufficient strength to the diaphragm. Thus it is apparent that by virtue of the present invention a strong, durable and gas-tight diaphragm has been provided while the desired flexibility is still maintained.

While the form of embodiment of the present invention as herein disclosed, constitutes a preferred form it is to be understood that other forms might be adopted, all coming within the scope of the claims which follow.

What is claimed is as follows:

1. A pressure responsive element comprising two diaphragms located in parallel, spaced relation and having telescopically fitting annular flanges, and means for joining the flanges, said means comprising a metal ring fitting around the outer annular flange and curved around one edge thereof and having a portion cooperating with the inner annular flange to define an annular groove, and a bonding material located in the groove.

2. The method of making a pressure responsive element which consists in assembling two diaphragms, one of which is provided with an aperture to admit fluid into the space between the diaphragms, in joining them at their edges by a metallic bond, in substantially filling the space within the element with an oily liquid to collect particles of metal or foreign matter, and in drawing the liquid from the element in order to remove said particles with the liquid.

3. The method of making a pressure responsive element which consists in assembling two diaphragms, one of which is provided with an aperture to admit fluid into the space between the diaphragms, in joining them at their edges by a metallic bond, in introducing a cleansing liquid within the element and withdrawing said liquid, in drying the element, in substantially filling the space within the element with an oily liquid to collect particles of metal or foreign matter, and in drawing the liquid from the element in order to remove said particles with the liquid.

4. The method of making a diaphragm which comprises simultaneously cupping a plurality of grained sheet metal plates with the grain of the plates at right angles to the grain of an adjacent plate.

5. The method of making a laminated diaphragm for a pressure responsive element which comprises superposing a plurality of sheet metal plates with the grain of one plate transverse to the grain of another plate, punching out discs of the desired size from said superposed plates, and simultaneously cupping the superposed discs into a flanged laminated body substantially as described.

In testimony whereof we hereto affix our signatures.

ELMER O. STOUT.
OTTO M. SUMMERS.